United States Patent

Kumada

Patent Number: 5,495,560
Date of Patent: Feb. 27, 1996

[54] OUTPUT APPARATUS WHICH TEMPORARILY STORES PATTERN DATA FOR OUTPUT

[75] Inventor: Shuichi Kumada, Yokohama, Japan

[73] Assignee: Canon Kabushiki Kaisha, Tokyo, Japan

[21] Appl. No.: 875,598

[22] Filed: Apr. 28, 1992

Related U.S. Application Data

[63] Continuation of Ser. No. 441,868, Aug. 24, 1989, abandoned.

[30] Foreign Application Priority Data

Aug. 31, 1988 [JP] Japan ................... 63-215039

[51] Int. Cl.⁶ ............................................. G06T 9/00
[52] U.S. Cl. .................. 395/114; 395/150; 395/162; 395/164
[58] Field of Search ................... 395/162–166, 395/110, 114–117, 118, 150, 151; 364/518–521; 340/739; 345/185–195, 202

[56] References Cited

U.S. PATENT DOCUMENTS

| | | | |
|---|---|---|---|
| Re. 30,679 | 7/1978 | Evans et al. | 364/523 |
| 4,079,458 | 3/1978 | Rider et al. | 364/900 |
| 4,254,467 | 3/1981 | Davis et al. | 364/521 |
| 4,607,138 | 8/1986 | Suzuki et al. | 178/30 |
| 4,627,002 | 12/1986 | Blum et al. | 364/519 |
| 4,672,459 | 6/1987 | Kudo | 364/518 X |
| 4,722,064 | 1/1988 | Suzuki | 364/518 |
| 4,852,020 | 7/1989 | Morita | 364/521 |
| 4,884,147 | 11/1989 | Arimoto et al. | 358/443 |
| 4,903,317 | 2/1990 | Nishihara et al. | 382/56 |
| 4,918,624 | 4/1990 | Moore et al. | 340/739 X |
| 5,113,494 | 5/1992 | Menendez et al. | 395/162 X |

FOREIGN PATENT DOCUMENTS 2731955  2/1978  Germany ................ G06K 15/20

OTHER PUBLICATIONS

IBM Technical Disclosure Bulletin, vol. 28, No. 11, Apr. 1986, p. 5003 "Vector Character Fonts In All-Points-Addressable Printer".

Primary Examiner—Almis R. Jankus
Attorney, Agent, or Firm—Fitzpatrick, Cella, Harper & Scinto

[57] ABSTRACT

This output apparatus has a memory for storing compressed data obtained by compressing a pattern or dot data representing a pattern. A controller determines whether the dot data representing the pattern to be output is stored in the memory or not. The controller also determines whether the compressed data corresponding to the pattern to be output is stored in the memory if the controller determines that no dot data representing the pattern is stored in the memory.

73 Claims, 3 Drawing Sheets

OUTPUT APPARATUS WHICH TEMPORARILY STORES PATTERN DATA FOR OUTPUT

This application is a continuation of application Ser. No. 07/441,868 filed Aug. 25, 1989 now abandoned.

BACKGROUND OF THE INVENTION

1. Field of the Invention

The present invention relates to an output apparatus and, more particularly, to an output apparatus having the function to temporarily store, for instance, pattern data to be output.

2. Related Background Art

Hitherto, in such a kind of apparatus, for instance, a vector font is developed into a dot pattern and, thereafter, the pattern data is stored in a dot matrix form. In this case, a character cache memory to temporarily store the font in a dot pattern state is used.

For instance, in the case of a character cache memory of the dot matrix form, the font based on a dot unit is stored into the memory without losing the entire font.

However, in the case of printing utilizing the vector font on the basis of the above conventional example, since the patternized font is stored in its pattern state, there is a problem such that the memory capacity is used in vain.

SUMMARY OF THE INVENTION

In consideration of the above point, it is an object of the present invention to provide an output apparatus in which vector data is converted into dot data and a dot pattern is output, wherein the caching is executed in a data format other than the dot data.

In consideration of the above point, it is another object of the invention to provide an output apparatus in which a plurality of kinds of data formats of character data to be cached can exist.

In consideration of the above point, still another object of the invention is to provide an output apparatus in which a check is made to see if character data to be output exists in a dot character data cache memory or not, and if it does not exist, a check is made to see if the character data to be output exists in a compressed character data cache memory or not.

In consideration of the above point, further another object of the invention is to provide an output apparatus in which a check is made to see if character data to be output has been stored in either one of a plurality of cache memories or not, and if it is not stored in any of the cache memories, vector data is converted into a predetermined data format and can be selectively stored into the cache memories.

In consideration of the above point, further another object of the invention is to provide an output apparatus having a plurality of kinds of cache memories, in which vector data is converted into other data format and the cache memory into which the vector data is stored can be selected.

In consideration of the above point, further another object of the invention is to provide an output apparatus in which when vector data corresponding to a pattern to be output is converted into other data format and is cached, the data format to be converted can be selected in accordance with the size of the pattern to be output.

In consideration of the above point, further another object of the invention is to provide an output apparatus in which when vector data corresponding to a pattern to be output is converted into other data format and is cached, the data format to be converted can be selected on the basis of an output speed or a memory capacity.

DETAILED DESCRIPTION OF THE PREFERRED EMBODIMENTS

A preferred embodiment according to the invention will be described in detail hereinbelow with reference to the drawings.

Figure 1:
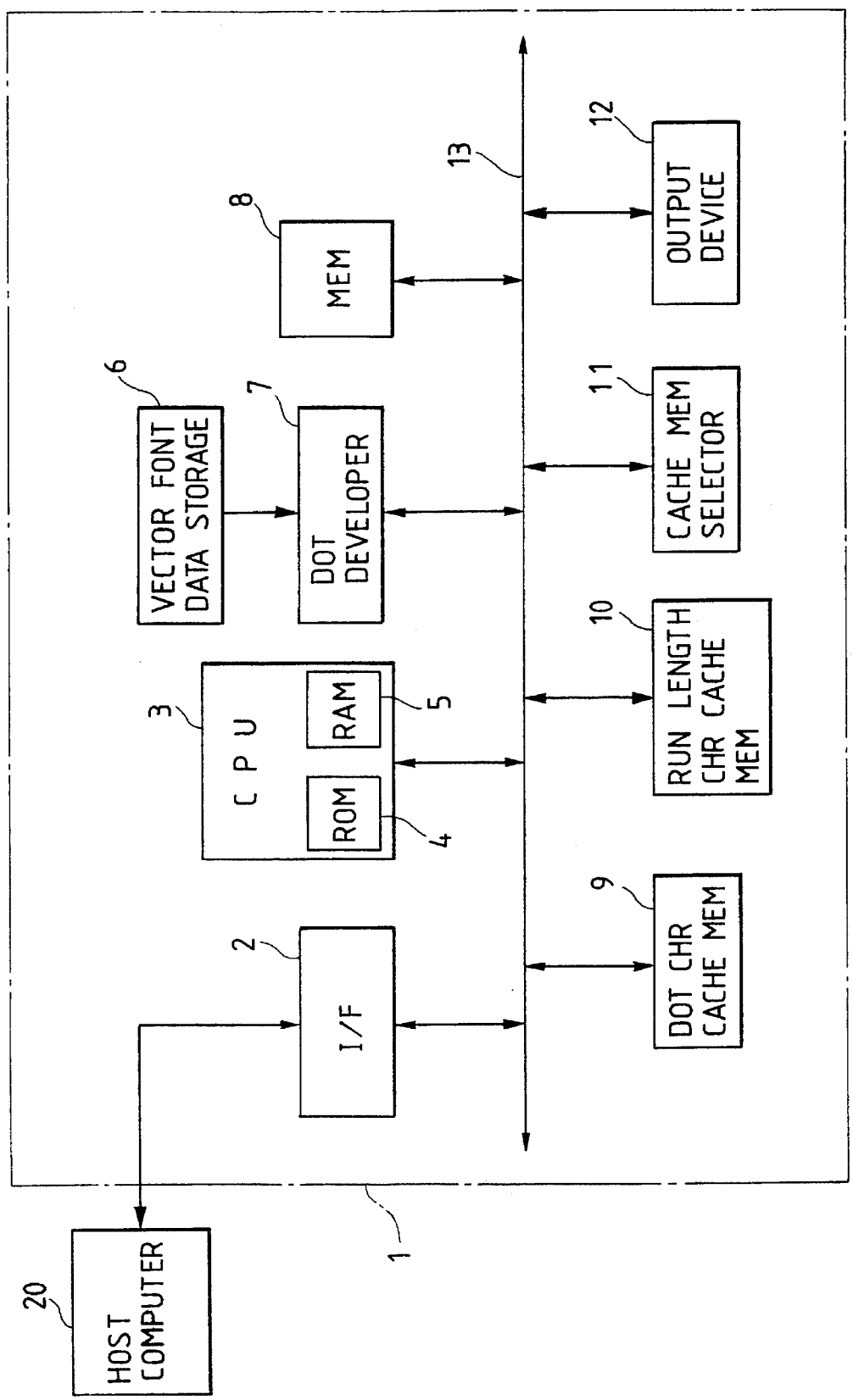
FIG. 1 is a block diagram for schematically explaining a construction of a printing apparatus in an embodiment according to the present invention.

FIG. 1 is a block diagram for schematically explaining a construction of an output apparatus in an embodiment according to the invention.

In FIG. 1, reference numeral 1 denotes a printing apparatus as an output apparatus in the embodiment. A construction of the printing apparatus 1 will be described. Reference numeral 2 indicates an interface to input print data (character code) and a print command from an external host computer 20. Reference numeral 3 denotes a CPU to control the whole apparatus. The CPU 3 has therein an ROM 4 and an RAM 5. A control program, an error processing program, a program according to a flowchart shown in FIG. 2, which will be explained hereinlater, and the like are stored in the ROM 4. The RAM 5 has work areas for various programs and a temporary storage area.

Reference numeral 6 denotes a vector font data storage in which the vector font data corresponding to the print data is stored. Reference numeral 7 indicates a dot developer for detecting the vector font corresponding to the print data from the vector font data storage 6 and for developing a dot pattern on a dot unit basis in a memory 8, which will be explained hereinlater. Reference numeral 8 indicates the memory to store the font pattern which was pattern developed by an amount of one page.

Reference numeral 9 indicates a dot character cache memory to temporarily store the font pattern which was pattern developed by the dot developer 7 in a dot matrix format. Reference numeral 10 indicates a run length character cache memory to temporarily store the font pattern which was pattern developed by the dot developer 7 in a run length encoding format. Since the run length encoding format itself is a well-known technique which has already been used in a facsimile apparatus and the like, its detailed description is omitted. However, even if a number of such technical literatures exist, the patentability of the present invention is not denied by them. Reference numeral 11 indicates a cache memory selector to select either one of the two cache memories as a memory into which the font pattern which was developed by the dot developer 7 is to be stored. It is sufficient that the foregoing run length character has been compressed as compared with the dot character, and the invention is not limited to it. It is also possible to use one data format in the step of converting the vector data into the dot data. Different areas in one memory unit may be also used in place of the two cache memories. A selecting method in the cache memory selector 11 will be described in detail in conjunction with the explanation of FIG. 2 later.

Reference numeral 12 denotes an output device to form a character onto a paper as a permanent visible image on the basis of the dot data of the amount of one page which was developed in the memory 8, Reference numeral 13 indicates a system, bus for addresses, data, control signals, etc. in the apparatus. In the embodiment of claims, the means which is expressed as a memory denotes one means or one area in one memory unit.

A printing method of the printing apparatus 1 in the embodiment will now be described.

Figure 2:
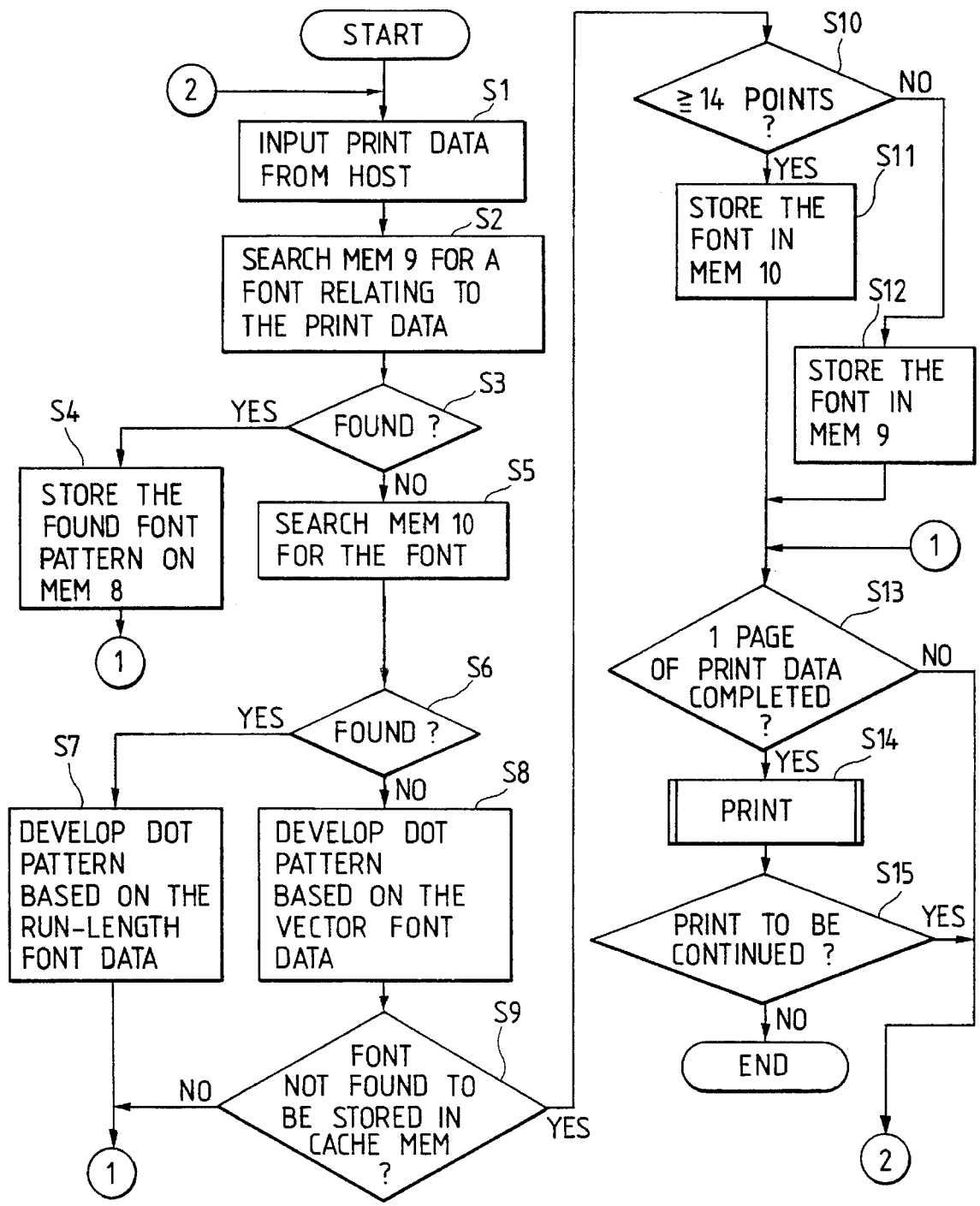
FIG. 2 is a flowchart for explaining the printing operation of the embodiment.

FIG. 2 shows a flowchart for explaining the printing operation of the embodiment.

First, a control command to print is input from the host computer 20, thereby setting the apparatus into the printable mode. After completion of such a preparation, print data is input from the host computer 20 (step S1). In the embodiment, the print data is input on a line unit basis. The font corresponding to the input print data is searched in the dot character cache memory 9 (step S2). If the corresponding font pattern could be detected in the memory 9, it is stored into the memory 8 (steps S3 and S4). Then, step S13 follows. On the other hand, if the font pattern cannot be detected in step S3, the corresponding font is searched in the run length character cache memory 10 (step S5).

If the corresponding font data could be detected from the memory 10, a pattern is developed on a dot unit basis in the memory 8 on the basis of the font data (steps S6 and S7). On the other hand, if the font data cannot be detected in step S6, the vector font data of the corresponding font is detected on the basis of the data in the vector font data storage 6 and a dot pattern is developed in the memory 8 on the basis of the vector font data (step S8).

A check is then made to see if the font which could not be detected from both of the dot character cache memory 9 and run length character cache memory 10 is stored into either one of those cache memories or not. In the embodiment, although not shown, a switch to decide whether the writing of data is permitted or inhibited is provided for the two cache memories. When the switch is turned on, the data writing is enabled. When the switch is turned off, the data writing is disenabled. Therefore, if the data writing is disenabled in step S9, step S13 follows. On the contrary, if the data writing is enabled in step S9, the point size of the dot pattern font is first detected. If the point size is the 14 point size or larger, the font is stored into the run length character cache memory 10 in a run length encoding format (steps S10 and S11). On the other hand, if the point size is determined to be smaller than the 14 point size in step S10, the font is stored into the dot character cache memory 9 in the dot matrix format (step S12). The point size can be arbitrarily set.

As mentioned above, after step S4, S9, S11, or S12, the processing routine advances to step S13 and a check is made to see if the data of one page has completely been developed in the memory 8 or not. In the discrimination of step S13, if the print data of the amount of one page is not input from the host computer 20 yet, the processing routine is returned to step S1 and the above-mentioned processes are repeated. On the other hand, if the completion of the development of the data of one page is confirmed in step S13, the dot data in the memory 8 is transmitted to the output device 12 and printed (step S14). If a print request is still generated from the host computer 20, the processing routine is returned to step S1 and the processes similar to those mentioned above are repeated (step S15).

It will be understood from the above description that, according to the embodiment, if the number of dot points of the font which was developed in a dot pattern is less than a reference value, the font is stored as an ordinary dot pattern, and if the number of dot points is the reference value or more, the font is stored in a run length encoding format, so that the memory capacity of the character cache can be saved as a whole.

In the above embodiment, the cache memory has been selected by checking as a reference whether the point size of the font is the 14 point size or more or smaller. Such a selecting method can be applied in the invention. That is, the dot character cache memory is selected for the font in which the printing speed can be improved if it is stored in the dot matrix format. On the other hand, the run length character cache memory is selected for the font in which the memory capacity can be saved if it is stored in the run length encoding system. In such a case, the selection of the character cache can be controlled by the attribute (point size, pitch, etc.) of the font and the printing process can be executed at a high speed. Those data are stored in the vector font data storage 6 or the like.

(Another embodiment)

Another embodiment will now be described.

Figure 3:
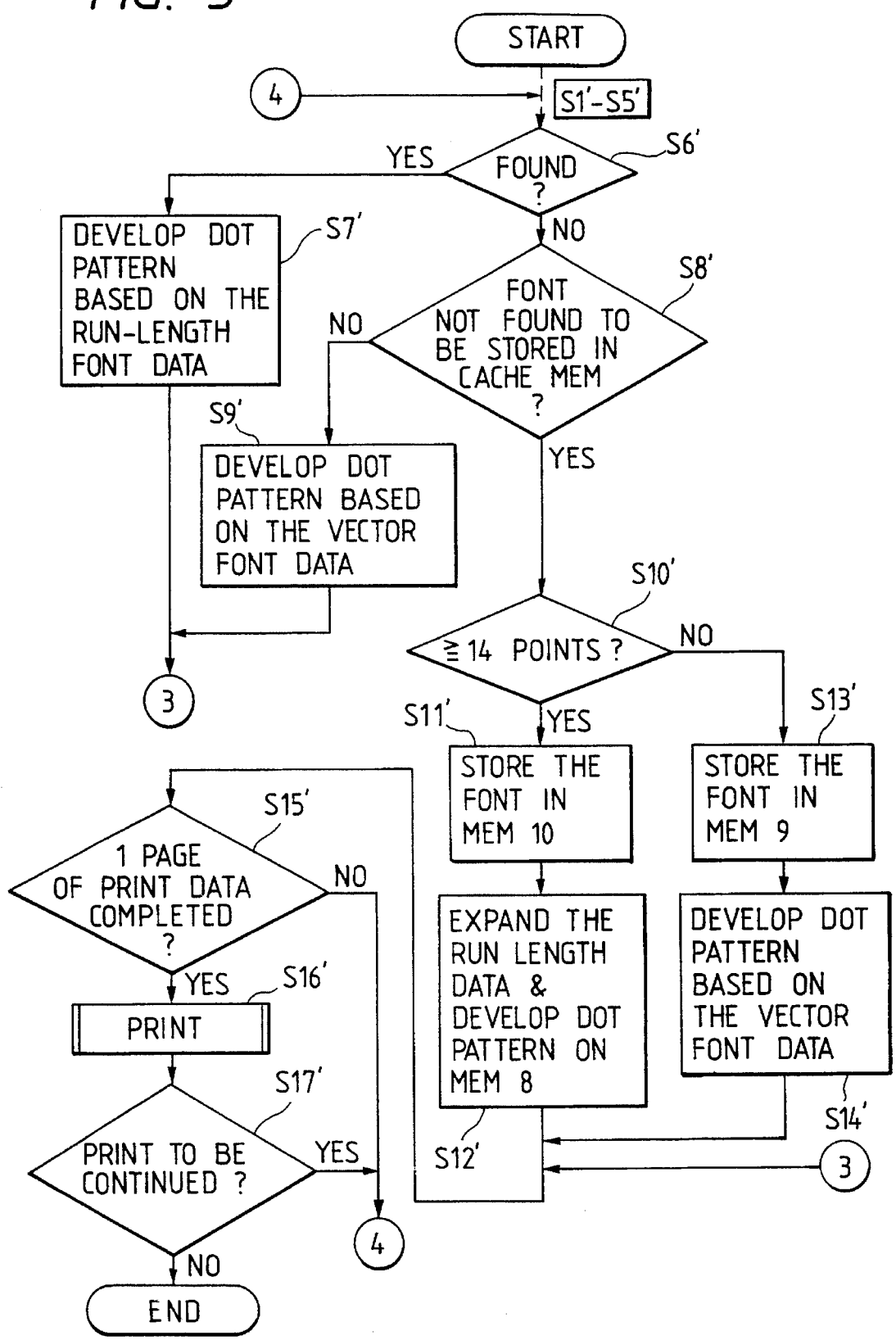
FIG. 3 a flowchart for explaining the printing operation in another embodiment.

FIG. 3 shows a flowchart for explaining the printing operation of another embodiment.

In another embodiment, since the operations in steps S1' to S5' are the same as those in the above embodiment, their descriptions are omitted. A construction of the apparatus in another embodiment is similar to that in the above embodiment and the same parts and elements as those in the first embodiment are designated by the same reference numerals.

If the corresponding font data has been detected in the run length character cache memory 10 in step S6', a pattern is developed on a dot unit basis in the memory on the basis of the font data (step S7').

On the other hand, if the font data cannot be detected in step S6', a check is made to see if the font which could not be detected from both of the memories 9 and 10 is stored into either one of the cache memories or not (step S8').

In another embodiment as well, in a manner similar to the first embodiment, although not shown, a switch to determine whether the data writing is permitted or inhibited is provided for the two cache memories. When the switch is turned on, the data writing is enabled. When the switch is turned off, the data writing is disenabled. Therefore, if the data writing is disenabled in step S8', step S9' follows. On the basis of the data in the vector font data storage 6, the vector data of the corresponding font is detected. On the basis of the vector font data, a dot pattern is developed in the memory 8.

On the contrary, if the data writing is enabled in step S8', the point size of the font is checked. If it is the 14 point size or larger, the font is stored into the run length character cache memory 10 in the run length encoding format (steps S10' and S11'). The run length data is expanded and a dot pattern is developed in the memory 8 (step S12').

On the other hand, if the point size is determined to be smaller than the 14 point size in step S10', the font is stored into the dot character cache memory 9 in the dot matrix format (step S13'). Further, on the basis of the data in the vector font data storage 6, the vector data of the corresponding font is detected. On the basis of the vector font data, a dot pattern is developed in the memory 8 (step S14').

After step S7', S9', S12', or S14', the processing routine advances to step S15' and a check is made to see if the data of the amount of one page has completely been developed in the memory 8 or not. If the print data of the amount of one page is not input from the host computer 20 yet in the discrimination of step S15', the processing routine is returned to step S1' corresponding to step S1 which has already been described in the first embodiment and the above-mentioned processes are repeated. On the other hand, if the completion of the development of the data of one page has been confirmed in step S15', the dot data in the memory 8 is transmitted to the output device 12 and printed (step S16').

If a print request is also generated from the host computer 20, the processing routine is returned to step S1' and the processes similar to those mentioned above are repeated (step S17').

It will be understood from the above description that, according to another embodiment, the operation and effects similar to those in the first embodiment can be obtained.

As described above, according to the invention, the memory capacity of the character cache to store, for instance, dot fonts can be saved. In addition, the printing process can be executed at a high speed by the selecting control of the character cache memories.

As described in detail above, in an apparatus for converting vector data into dot data and out- putting a dot pattern, an output apparatus for executing the caching in a data format other than the dot data format can be provided.

As described in detail above, an output apparatus in which a plurality of kinds of data formats of character data to be cached can exist can be provided.

As described in detail above, it is possible to provide an output apparatus in which a check is made to see if character data to be output exists in a dot character data cache memory or not, and if it does not exist, a check is made to see if the character data to be output exists in a compressed character data cache memory or not.

As described in detail above, it is possible to provide an output apparatus in which a check is made to see if character data to be output has been stored in either one of a plurality of cache memories or not, and if it is not stored in any of the cache memories, vector data is converted in a predetermined data format and can be selectively stored into the cache memories.

As described in detail above, it is possible to provide an output apparatus having a plurality of kinds of cache memories, wherein vector data is converted in another data format and the cache memory into which the vector data is stored can be selected.

As described in detail above, it is possible to provide an output apparatus in which when vector data corresponding to a pattern to be output is converted into another data format and cached, the data format to be converted can be selected in accordance with the size of the pattern to be output.

As described in detail above, it is possible to provide an output apparatus in which when vector data corresponding to a pattern to be output is converted into another data format and cached, the data format to be converted can be selected on the basis of an output speed or a memory capacity.

What is claimed is:

1. An output apparatus comprising:

memory means for storing character data, the character data comprising compressed data or dot data, both the compressed and dot data being obtained by conversion from vector data representing a particular character;

first determining means for determining whether dot data representing a character to be output is in said memory means; and second determining means for determining whether compressed data corresponding to the character to be output is in said memory means if said first determining means determines that the dot data representing the character to be output is not in said memory means.

2. An apparatus according to claim 1, wherein the compressed data comprises run length data.

3. An output apparatus according to claim 1, further comprising means for outputting a character, wherein if said first determining means determines that the dot data representing a character to be output is in said memory means, said output means outputs the character based on the dot data.

4. An output apparatus according to claim 1, further comprising means for outputting a character, wherein if said second determining means determines that the compressed data corresponding to the character to be output is in said memory means, said output means outputs the character based on the compressed data and wherein if said second determining means determines that the compressed data is not in said memory means, said output means outputs the character based on the vector data.

5. An output apparatus according to claim 3 or 4, wherein said output means comprises a printer.

6. An output apparatus comprising:

memory means for storing character data, the character data comprising compressed data or dot data, both the compressed and dot data being obtained by conversion from vector data representing the character;

discriminating means for discriminating whether compressed data corresponding to a character to be output or dot data representing the character to be output is in said memory means; and converting means for converting vector data, corresponding to the character to be output, into dot data if said discriminating means determines that the compressed data corresponding to the character to be output is not in said memory means and if said discriminating means determines that the dot data corresponding to the character to be output is not in said memory means.

7. An apparatus according to claim 6, wherein the compressed data comprises run length data.

8. An output apparatus according to claim 6, further comprising means for outputting the dot data converted by said converting means.

9. An output apparatus according to claim 8, wherein said output means comprises a printer.

10. An output apparatus comprising:

memory means for storing, for each of a plurality of characters, data of a plurality of kinds of data formats, that data being obtained by conversion from data of a vector format;

discriminating means for discriminating a size of one character; and converting means for converting vector data representing the one character into data of one data format of the plurality of kinds of data formats, the one data format being based on the size discriminated by said discriminating means.

11. An output apparatus according to claim 10, further comprising means for outputting a character using the data of one data format of the plurality of kinds of data formats converted by said converting means.

12. An output apparatus according to claim 11, wherein said output means comprises a printer.

13. An output apparatus according to claim 10, wherein said converting means converts the vector data representing the one character into data of a compressed data format if said discriminating means discriminates that the size of the one character is larger than a prescribed value and converts that vector data into data of a dot data format if said discriminating means discriminates that the size is smaller than the prescribed value.

14. An output apparatus according to claim 10 or 27, further comprising means for controlling said memory means to store the data converted by said converting means.

15. An apparatus for converting vector data representing a character into dot data representing the character and outputting the dot data, said apparatus comprising:

first cache means for converting the vector data into intermediate data different from the dot data and for storing the converted intermediate data in a memory;

a second cache means for directly converting the vector data into the dot data and for storing the converted dot data in the memory; and determining means for determining whether a character to be output is to be converted by said first cache means in response to how fast said apparatus can output the character using the first versus the second cache means.

16. An output apparatus according to claim 15, further comprising means for outputting a character based on the intermediate data or dot data stored in the memory.

17. An output apparatus according to claim 16, wherein said output means comprises a printer.

18. An output apparatus according to claim 16, wherein said output means outputs the character based on the vector data if neither the intermediate data nor the dot data is stored in the memory.

19. An output apparatus having a memory for converting vector data representing a character into dot data representing the character and outputting the dot data, said apparatus comprising:

first cache means for converting the vector data into intermediate data different from the dot data and for storing the converted intermediate data in a memory;

second cache means for directly converting the vector data into the dot data and for storing the converted dot data in the memory; and determining means for determining whether a character to be output is to be converted by said first cache means or said second means, in response to a capacity of the memory.

20. An output apparatus according to claim 19, further comprising means for outputting a character based on the intermediate data or dot data stored in the memory.

21. An output apparatus according to claim 20, wherein said output means comprises a printer.

22. An output apparatus according to claim 20, wherein said output means outputs the character based on the vector data if neither the intermediate data nor the dot data is stored in the memory.

23. A method for outputting data, comprising the steps of:

storing character data, the character data comprising compressed data or dot data, both the compressed and dot data being obtained by conversion from vector data representing a particular character;

determining whether dot data representing a character to be output is stored; and determining whether compressed data corresponding to the character to be output is stored if the dot data corresponding to the character to be output is determined not to be stored.

24. A method according claim 23, wherein the compressed data comprises run length data.

25. A method according to claim 23, further comprising the step of outputting a character, wherein if it is determined that the dot data representing a character to be output is stored, the character is output based on the dot data.

26. A method according to claim 23, further comprising the step of outputting a character, wherein if it is determined that the compressed data corresponding to the character to be output is stored, said output means outputs the character based on the compressed data and wherein if it is determined that the compressed data is not stored means, the character is outputted based on the vector data.

27. An output apparatus according to claim 25 or 26, wherein said outputting is performed by a printer.

28. A method for outputting data, comprising the steps of:

storing character data the or dot data, both the compressed and dot data being obtained by conversion from vector data representing a particular character;

discriminating whether either compressed data or dot data representing a character to be output is stored; and converting vector data, corresponding to the character to be output, into dot data if both the compressed data and the dot data representing the character to be output are determined not to be stored.

29. A method according to claim 28, wherein the compressed data comprises run length data.

30. A method according to claim 28, further comprising the step of outputting the converted dot data.

31. A method according to claim 30, wherein said outputting is performed by a printer.

32. A method for outputting data, comprising the steps of:

storing, for each of a plurality of characters, data of a plurality of kinds of data formats, that data being obtained by conversion from data of a vector format;

discriminating a size of one character; and converting vector data representing the one character into data of one data format of the plurality of kinds of data formats, the one data format being based on the size discriminated by said discriminating step.

33. A method according to claim 32, further comprising the step of outputting a character using the data of one data format of the plurality of kinds of data formats.

34. A method according to claim 33, wherein said outputting is performed by a printer.

35. A method according to claim 32, wherein, in said converting step, the vector data representing the one character is converted into data of a compressed data format if it is discriminated that the size of the one character is larger than a prescribed value and the vector data is converted into data of a dot data format if it is discriminated that the size is smaller than the prescribed value.

36. A method according to claim 32 or 35, further comprising the step of controlling the storing of the converted data.

37. A method for converting vector data representing a character into dot data representing the character and outputting the dot data, said method comprising the steps of:

determining whether a character to be output is to be converted by direct or indirect conversion in response to how fast the character can be output by direct conversion versus by indirect conversion, respectively; and converting the vector data into the dot data and outputting the dot data, wherein said converting is performed by first converting the vector data into intermediate data different from the dot data and then storing the converted intermediate data, when it is determined in said determining step that indirect conversion is to be used, and wherein said converting is performed by directly converting the vector data into the dot data and storing the converted dot data, when it has been determined in said determining step that direct conversion is to be used.

38. A method according to claim 37, further comprising the step of outputting a character based on the stored intermediate data or the stored dot data.

39. A method according to claim 38, wherein said outputting is performed by a printer.

40. A method according to claim 38, wherein said character is outputted based on the vector data if neither the intermediate data nor the dot data is stored 41. A method for converting vector data representing a character into dot data representing the character and outputting the dot data, said apparatus comprising the steps of:

determining whether a character to be output should be output by direct or by indirect conversion in response to an amount of data to be stored; and converting the vector data into the dot data and outputting the dot data, wherein said converting is performed by first converting the vector data into intermediate data different from the dot data and then and storing the converted intermediate data when it is determined in said determining step that indirect conversion is to be used, and wherein said converting is performed by directly converting the vector data into the dot data and storing the converted dot data, which it is determined in the determining step that direct conversion is to be used.

42. A method according to claim 41, further comprising the step of outputting a character based on the stored intermediate data or the stored dot data.

43. A method according to claim 42, wherein the outputting is performed by a printer.

44. An output apparatus according to claim 42, wherein the character is outputted based on the vector data if neither the intermediate data nor the dot data is stored.

45. A character output apparatus comprising:

first converting means for converting vector data defining the shape of a character to be output into compressed dot pattern data defining a corresponding output dot pattern;

second converting means for converting said compressed dot pattern data into the corresponding output dot pattern;

output means for outputting the dot pattern generated by said second converting means;

character pattern storage means for storing the compressed dot pattern data converted by said first converting means; and means adapted to read the stored pattern data from the storage means in place of performing the conversion from vector data in response to a request for a subsequent output of the same said character.

46. An apparatus according to claim 45, wherein said compressed dot pattern data comprises a run length encoded version of the corresponding output dot pattern.

47. An apparatus according to claim 45 or 46, wherein said output means comprises a printer.

48. An apparatus according to claim 45 or 46, wherein the character pattern storage means is arranged under predetermined circumstances to store the output dot pattern for a character, such that the character can be output subsequently without operation of the first or second converting means.

49. An apparatus according to claim 48, further comprising means for, in said predetermined circumstances, converting the vector data for a character directly to output dot pattern data.

50. An apparatus according to claim 49, wherein automatic selection means are further provided for storing the compressed dot pattern data and/or the output character dot pattern according to properties of the character dot pattern and the available storage capacity.

51. An apparatus according to claim 50, wherein said selection is based on an output speed and a storage means capacity corresponding to the character dot pattern 52. An apparatus according to claim 51, wherein said output means comprises a printer.

53. An apparatus according to claim 48, wherein said output means comprises a printer.

54. An apparatus according to claim 48, wherein automatic selection means are further provided for storing the compressed dot pattern data and/or the output character dot pattern according to properties of the character dot pattern and the available storage capacity.

55. An apparatus according to claim 54, wherein said selection is based on an output speed and a storage means capacity corresponding to the character dot pattern.

56. An apparatus according to claim 55, wherein said output means comprises a printer.

57. An apparatus according to claim 54, wherein said selection is based on the size of the character to be output.

58. An apparatus according to claim 57, wherein said output means comprises a printer.

59. An apparatus according to claim 54, wherein said output means comprises a printer.

60. An apparatus according to claim 49, wherein said output means comprises a printer.

61. An apparatus according to claim 50, wherein said selection is based on the size of the character to be output.

62. An apparatus according to claim 61, wherein said output means comprises a printer.

63. An apparatus according to claim 50, wherein said output means comprises a printer.

64. A method of operating a character output apparatus comprising the steps of:

converting vector data defining the shape of the character to be output into compressed dot pattern data defining a corresponding output dot pattern;

converting said compressed dot pattern data into the corresponding output dot pattern;

Supplying the output dot pattern to an output means of the apparatus;

storing the compressed dot pattern data converted from said vector data in a storage means of the output apparatus; and in the event that the same character is to be output subsequently, reading the stored data from the storage means instead of performing the conversion from vector data.

65. A character according to claim 64, wherein said compressed dot pattern data comprises a run length encoded version of the corresponding dot pattern.

66. A method according to claim 64 or 65, further comprising the step of, under predetermined circumstances, storing the output dot pattern for a character such that the character can be output subsequently without conversion from vector data or compressed dot pattern data.

67. A method according to claim 66, wherein, in said predetermined circumstances, the vector data for a character are converted directly to output dot pattern data for storage.

68. A method according to claim 67, wherein storage of the compressed dot pattern data and/or the corresponding output dot pattern is selected automatically according to properties of the character dot pattern and the available storage capacity.

69. A method according to claim 68, wherein said selection is based on an output speed and a storage capacity requirement corresponding to the character dot pattern.

70. A method according to claim 66, wherein storage of the compressed dot pattern data and/or the corresponding output dot pattern is selected automatically according to properties of the character dot pattern and the available storage capacity.

71. A method according to claim 70, wherein said selection is based on an output speed and a storage capacity requirement corresponding to the character dot pattern.

72. A character according to claim 70, wherein said selection is based on the size of the character to be output.

73. A character according to claim 68, wherein said selection is based on the size of the character to be output.

* * * * *

UNITED STATES PATENT AND TRADEMARK OFFICE
CERTIFICATE OF CORRECTION

PATENT NO. : 5,495,560

DATED : February 27, 1996

INVENTOR(S) : SHUICHI KUMADA

It is certified that error appears in the above-identified patent and that said Letters Patent is hereby corrected as shown below:

COLUMN 1

Line 6, "Aug. 25, 1989" should read --Aug. 24, 1989,--.

COLUMN 3

Line 53, "S11," should read --S11,--.

COLUMN 4

Line 55, "S11')." should read --S11').--.

COLUMN 5

Line 22, "out- putting" should read --outputting--.

COLUMN 6

Line 27, "the" should read --a particular--.

UNITED STATES PATENT AND TRADEMARK OFFICE
CERTIFICATE OF CORRECTION

PATENT NO. : 5,495,560

DATED : February 27, 1996

INVENTOR(S) : SHUICHI KUMADA

It is certified that error appears in the above-identified patent and that said Letters Patent is hereby corrected as shown below:

COLUMN 7

```
Line 5,  "or 27," should read --or 13,--.
Line 8,  "An" should read --An output--.
Line 18, "means" should read
         --means or said second cache means--.
Line 43, "second" should read --second cache--.
```

COLUMN 8

```
Line 9,  "stored means," should read --stored,--.
Line 14, "data the or" should read --data, the character
         data comprising compressed data or--.
```

COLUMN 9

```
Line 23, "and storing" should read --storing--.
Line 29, "which" should read --when--.
Line 37, "An output apparatus" should read --A method--.
```

UNITED STATES PATENT AND TRADEMARK OFFICE
CERTIFICATE OF CORRECTION

PATENT NO. : 5,495,560                    Page 3 of 3

DATED       : February 27, 1996

INVENTOR(S): SHUICHI KUMADA

It is certified that error appears in the above-identified patent and that said Letters Patent is hereby corrected as shown below:

COLUMN 10

```
Line 11, "pattern" should read --pattern.--.
Line 47, "Supplying" should read --supplying--.
Line 57, "character" should read --method--.
```

Signed and Sealed this

Tenth Day of September, 1996

Attest:

BRUCE LEHMAN

*Attesting Officer*          Commissioner of Patents and Trademarks